UNITED STATES PATENT OFFICE.

FRITZ MAYER, OF MAYENCE, GERMANY.

PROCESS OF MAKING DIALKYL-MALONYL-UREA.

No. 803,774.      Specification of Letters Patent.      Patented Nov. 7, 1905.

Application filed April 15, 1905. Serial No. 255,822.

*To all whom it may concern:*

Be it known that I, FRITZ MAYER, a subject of the German Emperor, residing at Mayence, Germany, have invented certain new and useful Improvements in Processes of Preparing Dialkyl-Malonyl-Urea, of which the following is a specification.

Heretofore it has been discovered that diethylmalonylurea has a great sleep-producing effect, whereas, for instance, dipropolmalonylguanidin is without such effect, (*Therapie der Gegenwart*, 1903, page 98, &c.) From this it has been concluded that the CO group, which is present in the urea molecule, is necessary to obtain said hypnotic effect. I have made the attempt to produce, if possible, even a stronger sleep-producing drug containing two CO groups by reaction between biuret and diethylmalonyl chlorid, according to the following equation:

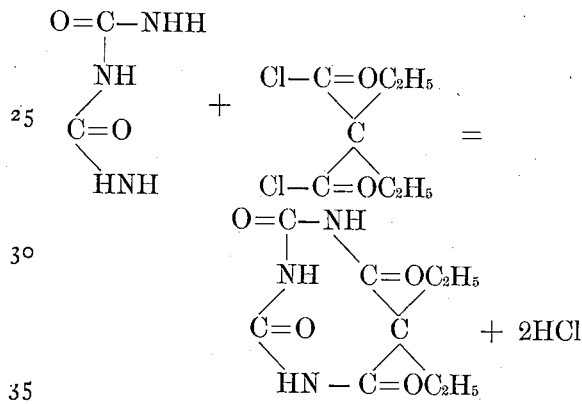

This attempt resulted in the unexpected and surprising fact that the reaction took the following course:

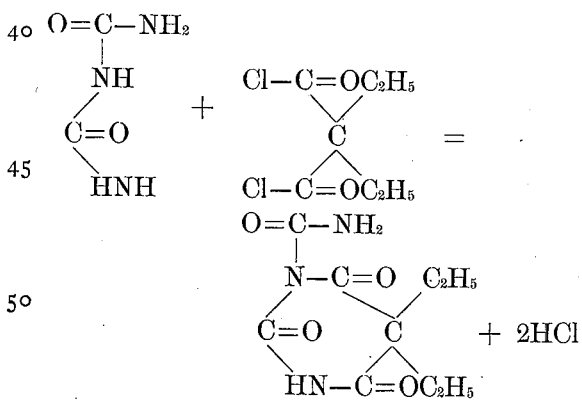

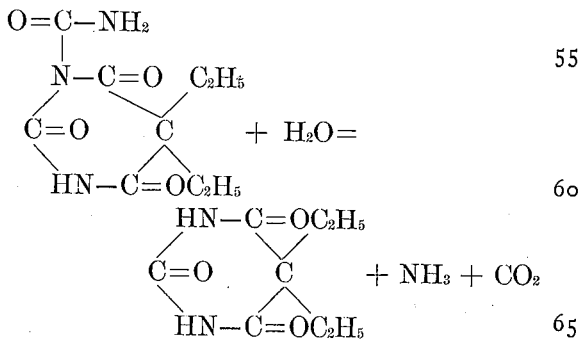

An example of one way in which this reaction may be carried out practically is as follows: 2.5 parts diethylmalonyl chlorid are heated with 4.7 parts of finely-powdered biuret on a water-bath for three or four hours or until the main product of the reaction is diethylmalonylurea, which is thereupon purified by well-known methods. A higher temperature may be used.

Although the alkyl that I have mentioned in the above description is ethyl and although the halide that I have mentioned is chlorid, I do not wish to be understood as limiting myself specifically to either the ethyl or the chlorid, unless so expressed in the claims.

The term "biuret" is used in the appended claims in its broad sense and is not to be understood as limited to the specific biuret of the precise formula above set forth.

Having thus described my invention, I claim as new and desire to secure by Letters Patent—

1. The process of preparing dialkylmalonylurea which consists in causing a chemical reaction between a biuret and a dialkylmalonylhalide.

2. The process of preparing dialkylmalonylurea which consists in causing a chemical reaction between a biuret and a dialkylmalonyl chlorid.

3. The process of preparing diethylmalonylurea which consists in causing a chemical reaction between a biuret and diethylmalonyl chlorid.

In testimony whereof I have hereunto signed my name in the presence of two subscribing witnesses.

FRITZ MAYER.

Witnesses:
     WALTER HAUSING,
     WALTER SCHUMANN.